United States Patent
Janesky

[11] Patent Number: 5,881,762
[45] Date of Patent: Mar. 16, 1999

[54] BASE-SURROUND RETROFIT ENCLOSURE ASSEMBLIES FOR CONTAINING LEAKAGE

[76] Inventor: Lawrence M. Janesky, 11 Fawn Meadow La., Huntington, Conn. 06484

[21] Appl. No.: 992,937

[22] Filed: Dec. 17, 1997

[51] Int. Cl.[6] .......................... H01H 29/06; F16K 31/02; G08B 21/00
[52] U.S. Cl. ....................... 137/312; 220/571; 122/504.2; 122/507; 137/558; 340/605; 340/604; 340/620
[58] Field of Search .................... 137/387, 312, 137/39, 558; 220/4.08, 4.21, 4.23, 4.25, 571, 4.07; 122/504, 504.2, 507; 126/363, 361; 340/604, 605, 620

[56] References Cited

U.S. PATENT DOCUMENTS

| | | | |
|---|---|---|---|
| 3,069,671 | 12/1962 | Taylor | 137/312 |
| 3,304,950 | 2/1967 | Hubert | 137/312 |
| 3,874,403 | 4/1975 | Fischer | 137/387 |
| 3,920,031 | 11/1975 | Maxfield | 137/312 |
| 4,667,702 | 5/1987 | Roth | 220/4.21 |
| 4,708,256 | 11/1987 | Intardonato | 220/4.21 |
| 4,765,360 | 8/1988 | Baird | 137/312 |
| 4,862,909 | 9/1989 | Kim | 137/312 |
| 4,903,723 | 2/1990 | Sublett | 137/312 |
| 4,944,253 | 7/1990 | Bellofatto | 137/312 |
| 5,085,205 | 2/1992 | Hall et al. | 126/363 |
| 5,125,247 | 6/1992 | Mills | 137/312 |
| 5,188,143 | 2/1993 | Krebs | 137/312 |
| 5,359,809 | 11/1994 | Johnson | 220/4.24 |
| 5,437,303 | 8/1995 | Johnson | 137/312 |
| 5,452,739 | 9/1995 | Mustee et al. | 137/312 |
| 5,634,485 | 6/1997 | Holtby | 137/312 |
| 5,645,103 | 7/1997 | Whittaker | 137/312 |
| 5,765,547 | 6/1998 | La Plante | 126/361 |

FOREIGN PATENT DOCUMENTS

| | | | |
|---|---|---|---|
| 7510537 | 3/1977 | Netherlands | 126/363 |

*Primary Examiner*—George L. Walton
*Assistant Examiner*—Bryan Wallace
*Attorney, Agent, or Firm*—Perman & Green, LLP

[57] ABSTRACT

A walled enclosure assembly adapted to be installed around the base of a water-containing appliance and bonded to the support floor to contain leakage therefrom without disturbing the appliance. The walled assembly comprises a plurality of wall segments, each having base flange, an upright wall and wall ends, each adapted to be bonded to the end of an aligned wall segment to form a continuous walled enclosure assembly. The assembly is designed to surround the base of a water-containing appliance, with the undersurfaces of the base flanges being bonded to the supporting floor to contain any leakage from the appliance. Preferably an integral drain tube is incorporated, and/or an automatic alarm means is attached which is activatable to signal excessive leakage.

4 Claims, 2 Drawing Sheets

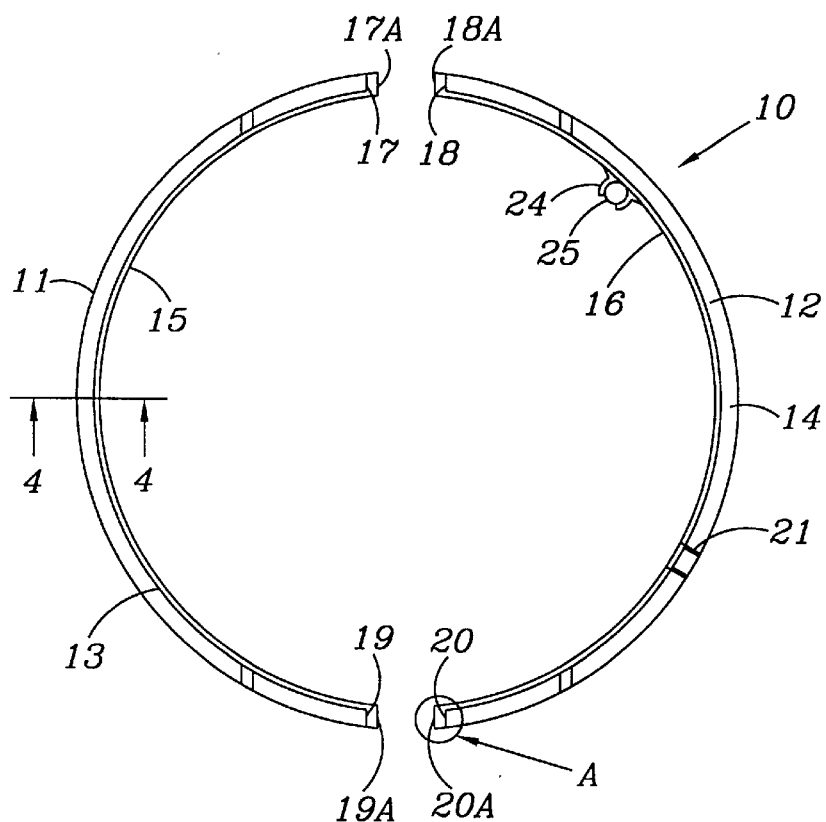
FIG. 1
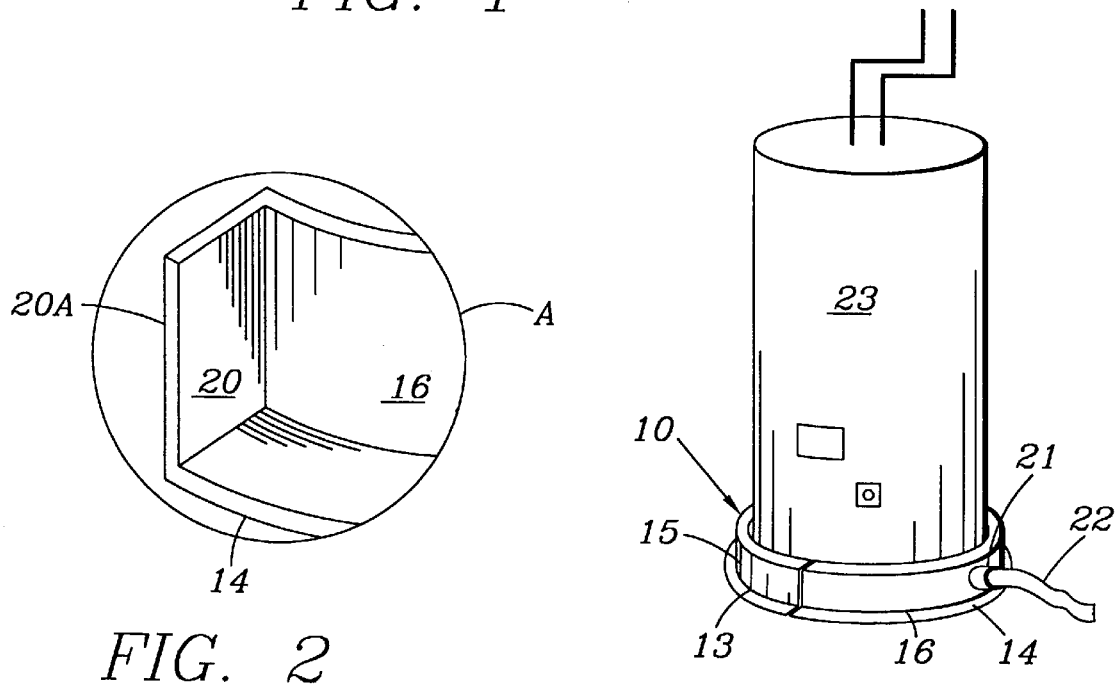
FIG. 2
FIG. 3

BASE-SURROUND RETROFIT ENCLOSURE ASSEMBLIES FOR CONTAINING LEAKAGE

BACKGROUND OF THE INVENTION

1. Field of the Invention

The present invention relates to retrofit devices for containing water leakage from water-containing household appliances such as water heaters, washing machines, furnaces and similar appliances and, according to a preferred embodiment, for warning the owner that water leakage is occurring.

2. Description of the Prior Art

A number of devices are known for containing water leakage from water-containing household appliances but none of these known devices are easily attachable to appliances which are fixed to the floor or have connected water-supply pipes, or drains which pass through the floor, or which are too heavy to lift from the floor, since all of the known devices comprise a container into which the appliances must be placed and having a floor to support the appliance.

Reference is made to U.S. Pat. No. 5,085,205 for its disclosure of a unitary drainage pan container having a drainage outlet fitting, for containing water leakage from a water-heating appliance. The unitary drainage container cannot be installed without shutting off the appliance, draining the water, disconnecting the water pipes and gas vent, moving the appliance, positioning the drainage container, lifting the appliance into the drainage container, resoldering the water pipes and reconnecting the gas vent. Then the water heater must be refilled with water and ignited, and the owner must wait for the availability of hot water.

Reference is also made to U.S. Pat. Nos. 4,765,360 and 5,645,103 for their disclosures of water heater leak-collecting drainage funnel stands designed to be placed under hot water heaters to collect water leakage and channel it to a central drain supported above the floor. The installation of the drainage stands of these patents requires all of the steps mentioned above represent expense and inconvenience to the owner.

Reference is also made to U.S. Pat. Nos. 3,304,950; 4,903,723 and 5,437,303 which disclose leak-collection trays or basins for positioning under washing machines to collect water leakage and channel it to a drain or spigot. These are devices which must be placed under the washing machine and cannot be installed without moving the washing machine.

SUMMARY OF THE INVENTION

The present invention relates to base-surround walled enclosure assemblies adapted to be retrofitted to a water-containing appliance, without disturbing the appliance, in order to collect any water which might leak from the appliance. According to a preferred embodiment of the present invention, the walled enclosure assembly includes a wall drain adapted to be connected to a drain hose or to a drain tube to a sump pump or other outlet. According to another preferred embodiment, the walled enclosure is provided with a water level sensor associated with an alarm which warns the owner that the appliance is leaking when the water leakage reaches a predetermined level within the walled enclosure.

The present walled-enclosure assemblies comprise two or more wall segments, such as two semi-circular wall segments, each having an L-shaped cross-section, which are designed to be bonded to one another to provide a continuous walled enclosure, and which have a floor-engaging lower peripheral base flange, such as a semicircular base flange, having a flat undersurface which is designed to be bonded to the appliance-supporting floor, around the base of the appliance, to provide a water-tight base enclosure for containing water leakage from the appliance.

THE DRAWINGS

In the accompanying drawings:

FIG. 1 is a plan view of a two-piece circular walled enclosure assembly according to one embodiment of the present invention, the semi-circular sections thereof being shown in spaced relation for purposes of illustration;

FIG. 2 is a perspective view of the circled area A of the wall section of FIG. 1;

FIG. 3 is a perspective illustration of a walled enclosure assembly according to FIGS. 1 and 2 mounted in position surrounding the base of a water heater, with a drain hose attached;

DETAILED DESCRIPTION

Figure 5:
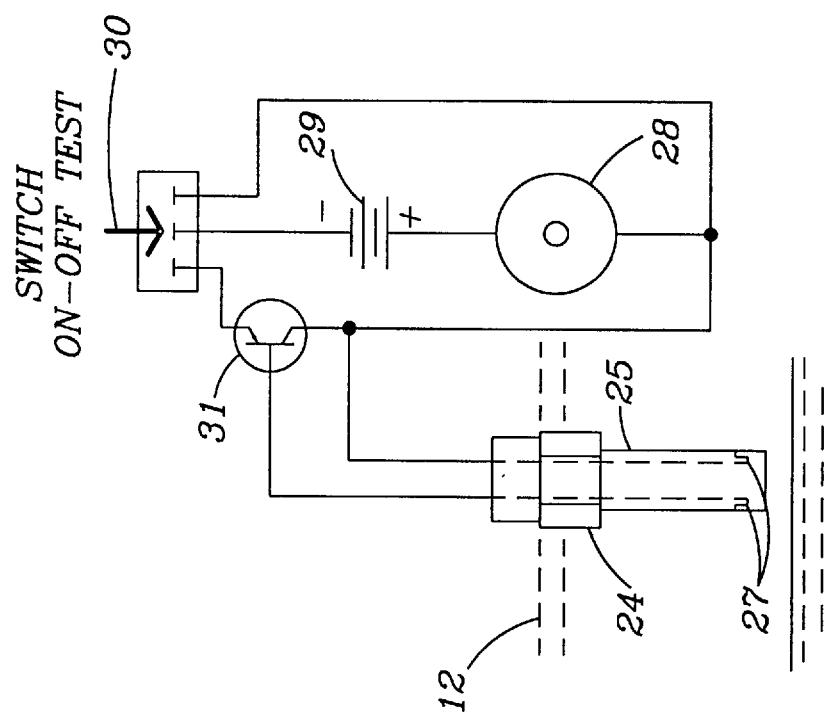
FIG. 5 is an illustration of a water level-sensing alarm system which can be incorporated with the assembly of FIG. 1.

Referring to the Drawings, the walled enclosure assembly 10 thereof comprises a mating pair of L-shaped semi-circular enclosure sections 11 and 12, each comprising an arcuate base flange 13, 14, a perpendicular arcuate wall section 15, 16, and mating pairs of radially-extending wall flanges 17, 18 and 19, 20 which are integral with the wall sections 15, 16 and with the base flanges 13, 14 and have smooth, radially-extending faces 17A, 18A and 19A, 20A designed to be bonded to the face of the companion wall flange to form a continuous circular walled enclosure which can be assembled around the base of an operating appliance without disturbing the appliance, as illustrated by FIG. 3.

The undersurfaces of the base flanges 13, 14 are bonded to the surface of the appliance-supporting floor, such as by means of a continuous bead or coating of adhesive such as caulk, epoxy resin or other water-resistant bonding material which is also applied to the faces 17A and 18A and to the faces 19A and 20A to form a water-tight, base-surrounding, leak-collecting enclosure which is installed rapidly, inexpensively and without any interruption in the operation of the appliance.

Preferably one of the enclosure sections, such as section 12 of FIG. 1, is provided with a drain tube, preferably an end-threaded drain tube 21 adapted to be threadably-engaged by the fitting of a garden hose 22 to enable the water accumulated within the walled enclosure 10 surrounding the base of an appliance, such as a water heater 23, to drain off to a remote site, as illustrated by FIG. 3, in the event that the leakage is excessive and immediate repairs are not possible.

It will be apparent to those skilled in the art that the present assemblies preferably are molded from synthetic thermoplastic molding compositions such as of polyethylene, polypropylene, polyacrylamide, polyvinyl chloride, polyacrylic esters, or the like or from lightweight polymer foams such as of polystyrene, phenolic resin, polyurethane resin, or the like.

Figure 4:
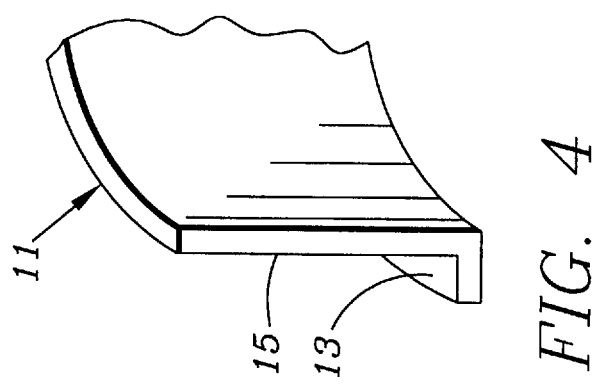
FIG. 4 is a perspective cross-sectional view along the line 4—4 of FIG. 1.

The novel walled enclosure assemblies of the present invention may be molded in various shapes and sizes and number of sections to conform closely to the shape and dimensions of the base of the water-containing appliance being surrounded. Generally it is preferred that the assembly comprises two sections, as shown in FIG. 4, for ease of installation, and circular in shape for use around cylindrical appliances such as water heaters, water purifiers, etc. or rectangular in shape for use around washing machines, dishwashers, etc.

A variety of different bonding materials may be used to bond the assembly sections to each other and to the supporting floor, provided that such materials are water resistant even after prolonged exposure. Preferred bonding materials are conventional curable epoxy resin compositions, floor tile adhesive compositions and adhesive caulking compositions such as Liquid Nails®.

As illustrated by FIGS. 1 and 5, the walled assembled 10 can include mounting means 24 or brackets fastened or integral with the interior surface of the wall 15 or 16, for holding a water-level sensor 25 at a predetermined height above the supporting floor so that when the water level within the enclosure reaches the contacts 27, a circuit is completed thereacross to enable current to flow from one contact 27 to the other contact 27 to complete the alarm circuit and cause the audible alarm component 28 to be energized by the battery 29 to warn the occupant that the leakage is excessive.

The alarm system illustrated by FIG. 5 further comprises an on-off-test switch 30 and a transistor 31 which by-passes the probe to enable the battery 29 to be tested when the switch is activated to the test mode from the normal on mode.

The present alarm system is battery-powered, so as to operate independently of house current, and the alarm module may be located at any remote location of the building at which the activated alarm is most likely to be heard at the earliest possible time.

The length of the sensor 25 down into the walled enclosure 10 will depend upon the depth of the housing and the distance between the desired alarm-activation water level and the top of the wall. Adjustments may be made by using adjustable position brackets 24, shown in FIG. 1, to provide a desired alarm-activation position.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A walled enclosure assembly adapted to be installed around and to enclose the base of a water-containing appliance, without disturbing the appliance, said assembly comprising a plurality of wall segments, each having an L-shaped cross-section and comprising a base flange section having a flat undersurface, an upright wall section, and radially-extending wall end sections, each adapted to be bonded to the wall end section of an aligned wall segment, to form a continuous walled enclosure, with the flat undersurfaces of said base flanges forming a continuous base flange adapted to be bonded to the supporting floor, to form a water-tight enclosure to contain any leakage from the appliance.

2. A walled enclosure assembly according to claim 1 comprising a pair of mating arcuate wall segments each having a hemi-cylindrical wall section, an arcuate base flange section and a radial wall end section communicating with both the wall section and the base flange.

3. An assembly according to claim 1 in which one of said wall segments has a transverse drain opening through the upright wall section thereof, adapted to be connected to a conduit for draining excess water from within the enclosure to a remote drain.

4. An assembly according to claim 1 comprising a water level-sensing means for activating an alarm when the level of water leaked into the enclosure reaches a predetermined level.

* * * * *